United States Patent [19]

Miller et al.

[11] Patent Number: 4,555,238

[45] Date of Patent: Nov. 26, 1985

[54] FLEXIBLE SHAFT HAVING DETACHABLE END CONNECTIONS

[75] Inventors: William J. Miller, Hartford; Norman Faber, Jr., Allenton, both of Wis.

[73] Assignee: Wacker Corporation, Hartford, Wis.

[21] Appl. No.: 665,618

[22] Filed: Oct. 29, 1984

[51] Int. Cl.⁴ .......................... F16C 1/08; F16D 3/00
[52] U.S. Cl. ..................................... 464/52; 464/173; 464/182
[58] Field of Search ................. 74/501 P; 464/52, 53, 464/57, 58, 173, 174, 181, 183, 901, 182

[56] References Cited

U.S. PATENT DOCUMENTS

| | | | |
|---|---|---|---|
| 1,872,288 | 8/1932 | Helgeby | 464/52 X |
| 2,596,335 | 5/1952 | Kessler | 464/53 |
| 3,340,703 | 9/1967 | Mincuzzi | 464/53 |
| 4,280,338 | 7/1981 | Shannon et al. | 464/58 X |

Primary Examiner—Stuart S. Levy
Assistant Examiner—Daniel P. Stodola
Attorney, Agent, or Firm—James E. Nilles

[57] ABSTRACT

A rigid connector secured to the front end of the core of the flexible shaft of this invention has a front portion axially receivable in a noncircular well in a driving shaft of a driving device and has a radially projecting circumferential flange rearwardly adjacent to that portion. Secured to the front of its sheath is the rear one of two telescoped tubular parts, each of which has a counterbore that opens to the other and defines an internal annular shoulder. One tubular part is threaded into the counterbore in the other, and the flange is axially slidable in the counterbore in that one, between the shoulders. The front portion of the front tubular part is formed for detachable securement directly to a conventional fixed collar on the driving device.

2 Claims, 4 Drawing Figures

FLEXIBLE SHAFT HAVING DETACHABLE END CONNECTIONS

FIELD OF THE INVENTION

This invention relates to flexible shafts of the type comprising an elongated flexible sheath which has opposite ends that are detachably connectable, respectively, to a relatively stationary driving device and to a portable driven device, and an elongated flexible core which is rotatable in the sheath and which transmits rotation from a rotatable shaft of the driving device to a rotatable shaft of the driven device; and the invention is more particularly concerned with means on such a flexible shaft for quickly and securely but detachably connecting it with driving and driven devices and whereby its core is at all times releasably confined against endwise displacement out of its sheath.

BACKGROUND OF THE INVENTION

A flexible shaft of the type to which this invention relates is typically connected between a relatively stationary driving device such as an electric motor or a gasoline engine, and a portable driven device. A typical driven device is a rod-like hand-held concrete vibrator which is moved laterally through a body of freshly poured concrete, such as that of a footing or a wall, to agitate the concrete and eliminate voids in it. The vibrator comprises a relatively slender cylindrical casing, typically about 18 inches (455 mm) long, in which there is journaled an eccentrically weighted shaft that rotates at high speed (e.g., 10,000 rpm or higher) to impart lateral vibration to the casing. Such a vibrator must be powered from a driving device which produces on the order of a full horsepower and which would therefore be too heavy to be mounted on the hand-held vibrator itself. A flexible shaft allows the vibrator to be connected with a driving device that remains relatively stationary and at the same time allows the vibrator to be easily manipulated.

A flexible shaft comprises an elongated flexible sheath which is connected to relatively stationary parts on the driving and driven devices to be confined against rotation, and an elongated flexible core which rotates inside the sheath and which provides a rotation transmitting connection between a driving shaft of the driving device and a driven shaft of the driven device. The flexible core ordinarily comprises a closely wound helix of spring wire. Since the core must be lubricated all along its length to minimize its friction with the sheath, it should be readily removable endwise from the sheath for lubrication at regular intervals.

Every driving device suitable for a concrete vibrator has a driving shaft with an unthreaded external surface and in which there is an endwise opening well of square cross-section that provides for connection with the core of a flexible shaft. Fixed on the housing of the driving device and projecting outwardly from it is a collar which is coaxial to the driving shaft and has an inside diameter substantially larger than the diameter of that shaft. This collar provides for a nonrotatable connection between the flexible shaft sheath and the driving device and tends to protect the driving shaft when the flexible shaft is not connected to it.

The flexible shaft heretofore available for use with concrete vibrators had several disadvantages. Secured to a front end portion of its core was a ferrule-like fitting having a rear portion that was clinched to the core and a front portion which had an internal thread and which therefore could not be directly coupled to the driving shaft of the driving device. At a front end of its sheath this prior flexible shaft had a rigid sleeve or ferrule with an internally threaded front end portion, and this securement means on the sheath was likewise not suitable for direct connection to the fixed collar on the driving device housing inasmuch as that collar had unthreaded radially inner and outer surfaces. Thus, connection of the prior flexible shaft to the driving device required a separate coupling adapter which was first installed on the flexible shaft and was then connected to the driving device.

The coupling adapter comprised a sturdy tubular sleeve consisting of coaxial front and rear telescoped sleeve parts, a ball bearing in the sleeve, intermediate its ends and axially confined between internal shoulders on the respective sleeve parts, and a spindle coaxially rotatable in the ball bearing and projecting forwardly and rearwardly beyond it. Spring clips, received in circumferential grooves in the spindle at axially opposite sides of the ball bearing, confined the spindle against axial movement relative to the adapter sleeve. The front end portion of the adapter spindle had a square cross-section, to be receivable in the mating well in the shaft of the driving device;, its rear end portion had an external thread that mated with the internal thread on the ferrule-like front core fitting. An external thread on the rear end portion of the adapter sleeve mated with the internal thread on the front securement means on the sheath, and the front end portion of the adapter sleeve was formed for connection to the fixed collar on the driving device. The core of the flexible shaft was first screwed onto the adapter spindle and then the securement means on the sheath was screwed onto the rear part of the adapter sleeve.

Ordinarily the core of the flexible shaft moved easily into and out of the sheath, and allowing the core to project from the sheath risked the possibility that the lubricated core would pick up abrasive dirt. With the coupling adapter installed, the core was substantially confined against lengthwise motion relative to the sheath, and therefore the adapter was usually kept attached to the flexible shaft.

The fixed collar on the driving device has an endwise slidable detent pin extending radially through it and biased radially inwardly to a normal position in which its inner end is near the driving shaft but spaced from it. The front end portion of the adapter sleeve had a plain cylindrical surface which was axially slidably receivable in the collar and had circumferentially spaced radially outwardly opening holes in which the detent pin was receivable. Thus, with the detent pin drawn out, the adapter sleeve was slid axially into the collar at the same time that the adapter spindle was axially inserted into the well in the driving shaft, and then the detent pin was released and the adapter sleeve was rotated until that pin dropped into one of the holes in it.

Although the coupling adapter was not unduly expensive, its elimination was nevertheless obviously desirable from a cost standpoint and to avoid the inconvenience of having to secure the flexible cable to the adapter before connecting it with the driving device.

Another and perhaps more important disadvantage involved in the use of the coupling adapter was that its bearing often became highly heated when the apparatus was in use, and heat from that bearing tended to be conducted along the sheath, often causing it to become too hot to handle comfortably, even at its end connected with the driven device. Such heating was most likely to occur when the core of the flexible shaft had been elongated by use and tended to impose substantial axial thrust force upon the bearing of the coupling adapter, owing to reaction of the core against the driven shaft of the driven device and the connection of the sheath to that device.

Attached to the sheath at its rear end, that is, its end connectable to the driven device, is a sturdy tubular sleeve which is received in a fixed collar on the driven device and which has an external thread that mates with an internal thread in that collar. For connection of the flexible shaft core with the driven shaft, the driven shaft has a square cross-section, and a ferrule-like fitting, clinched to the rear end of the core, projects coaxially a substantial distance rearwardly beyond the sleeve and defines a rearwardly opening well of square cross section in which the driven shaft is axially slidably engageable and disengageable.

Although the mating square-section socket portions of the rear core fitting and of the driven shaft are of substantial axial length, to provide a driving connection between them that accommodates a substantial amount of elongation of the core relative to the sheath, the core, when elongated beyond a certain point, tended to be compressed lengthwise between the driven device and the coupling adapter, and the compressive force upon it was imposed upon the bearing of the coupling adapter and tended to heat it.

SUMMARY OF THE INVENTION

The general object of this invention is to provide a flexible shaft of the character described that is readily detachably connectable with a driving device and with a driven device and which is directly connectable with a driving device having the above described arrangements for connection of a flexible shaft thereto.

Thus it is also a general object of this invention to provide a flexible shaft which can be directly detachably coupled to a driving device of the character described without need for the coupling adaptor heretofore required, but wherein the core is nevertheless confined against endwise displacement out of the sheath but is readily releasable to be quickly removable from the sheath for lubrication or replacement.

A more specific object of the invention is to provide a flexible shaft which tends to run cool under all conditions and which has no need for the coupling adapter heretofore required with apparatus comprising driving and driven devices that are connected by a flexible shaft, thus eliminating the cost and inconveniences occasioned by that adapter.

In general, the flexible shaft of this invention is one whereby rotation is transmitted from a rotatable driving shaft of a relatively stationary driving device to a rotatable driven shaft of a portable driven device, comprising an elongated flexible sheath having rigid securement means at its opposite ends, one for each of said devices, whereby the sheath is detachably and nonrotatably connectable with said devices, and an elongated flexible core which is rotatable in said sheath and is endwise insertable thereinto and removable therefrom. The flexible shaft of this invention is characterized by its core having rigid axially outwardly projecting connector means fixed to each of its ends, one for each of said rotatable shafts, each said connector means being axially slidably connectable with an end portion of its rotatable shaft that has a noncircular cross-section, and said connector means for the rotatable shaft of one of said devices having fixed thereon a coaxial radially outwardly projecting circumferential flange that is spaced axially inwardly from its outer end. The flexible shaft is further characterized by the securement means for said one device comprising coaxial front and rear tubular members that are detachably connected in telescoped relationship, the rear tubular member having a rear portion secured to an end portion of the sheath and a counterbore which opens to its front end and which defines a coaxial annular shoulder that is spaced behind said front end and faces the same, and the front tubular member having a counterbore which opens to a rear end thereof and which defines a coaxial annular shoulder that is spaced from its rear end and faces the same. One of said tubular members has a portion which is received in the counterbore in the other tubular member, with said shoulder in that one tubular member opposing and axially spaced from the shoulder in said other, and said flange is axially slidable in the counterbore in said other tubular member between limits defined by said shoulders. The front tubular member has means on a front portion thereof for detachably securing the same to a fixed part of said one device in concentric surrounding relation to the rotatable shaft thereof and with said connector means for that rotatable shaft connected thereto.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF THE INVENTION

Figure 1:
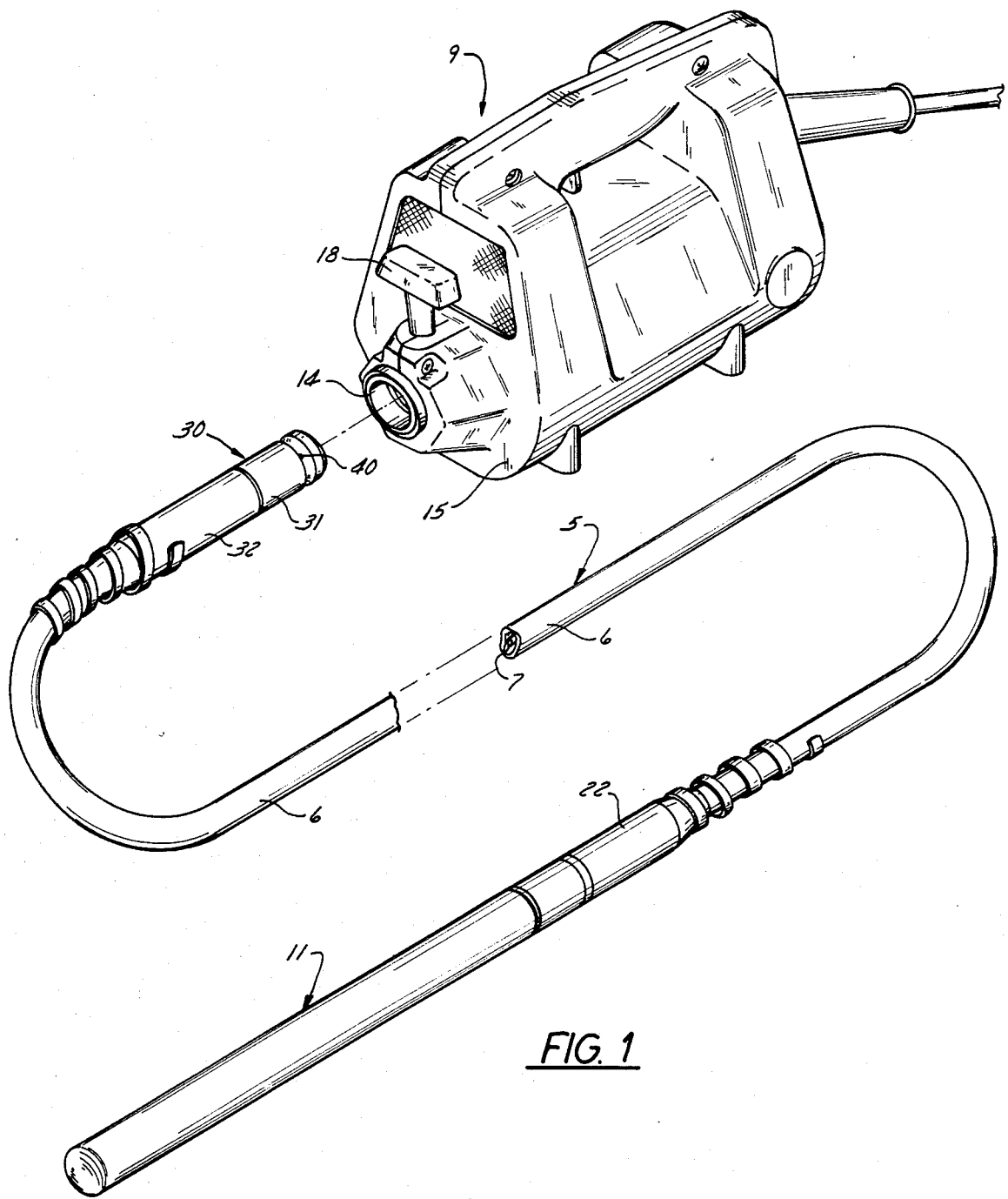
FIG. 1 is a perspective view of a flexible shaft of this invention connected with driving and driven devices.
Figure 2:
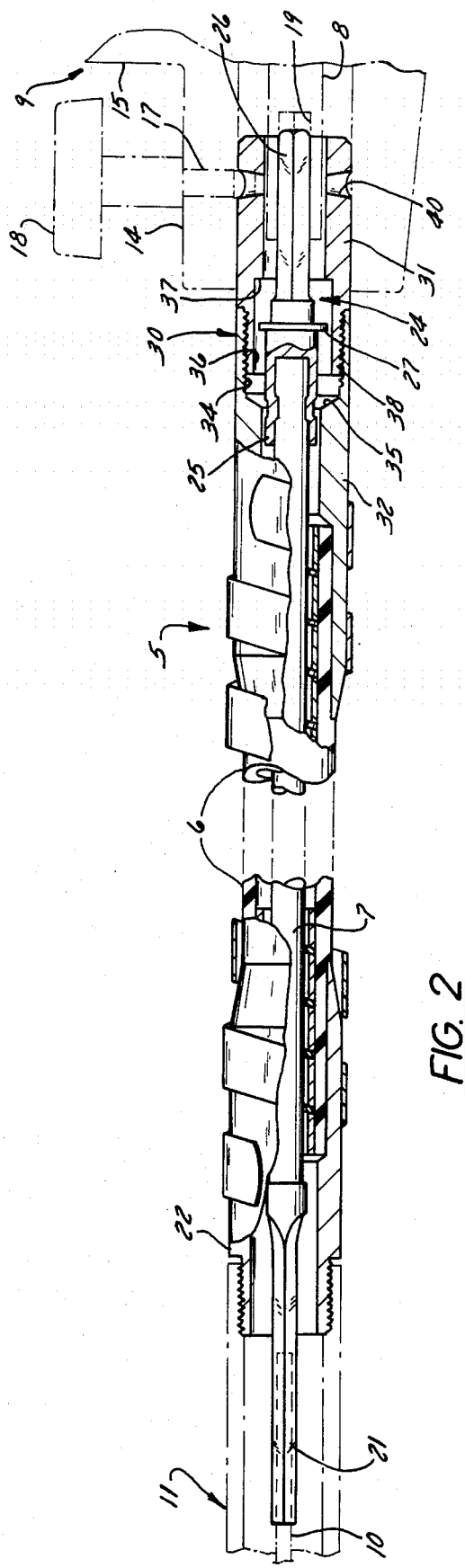
FIG. 2 is a view in side elevation of the flexible shaft of this invention, with portions broken away and shown in longitudinal section.
Figure 4:
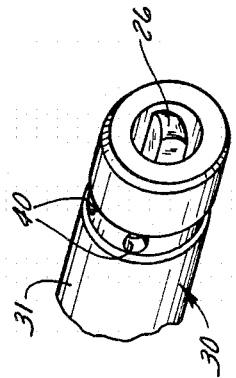
FIG. 4 is a fragmentary perspective view of the front end portions of the core and sheath.
Figure 3:
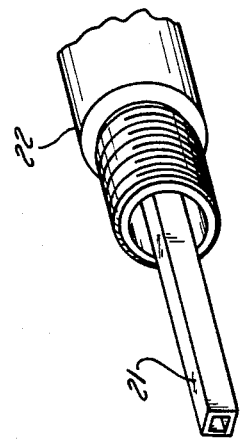
FIG. 3 is a fragmentary perspective view of the rear end portions of the core and sheath of the flexible shaft.

A flexible shaft 5 that embodies the principles of this invention comprises an elongated flexible sheath 6 and a flexible core 7 which is approximately as long as the sheath and which is rotatable in the sheath to transmit torque from the driving shaft 8 of a driving device 9 to the driven shaft 10 of a driven device 11. In this case the driving device 9 is illustrated as an electric motor, but it could as well be a small gasoline engine, a hydraulic motor or any other type of prime mover having a rotatable driving shaft. The driven device 11 is shown by way of example as a hand-held concrete vibrator, which requires a substantial amount of power but must be readily portable and maneuverable and which is therefore driven through the flexible shaft 5 from the relatively heavy and normally stationary driving device 9.

The end of the flexible shaft 5 that is connectable with the driving device 9 is herein referred to as its front end, its opposite end being termed its rear end.

When the flexible shaft 5 is in use, its sheath 6 is detachably secured at its front end to the stationary housing of the driving device 9 and is detachably secured at its rear end to the relatively stationary housing of the driven device 11, so that the sheath is confined against rotation but is free to flex. The core 7 conventionally comprises a closely wound helix of spring wire, and it will be understood that the core will normally be coated all along its length with a suitable lubricant that minimizes its friction with the sheath and would permit it to slide lengthwise rather freely out of the sheath if it were not restrained from doing so.

To provide for connection of the sheath 6 to the driving device 9, the driving device conventionally has a rigid annular collar or sleeve 14 that is fixed to its housing 15. The radially inner and outer surfaces of the fixed collar 14 are cylindrical and are concentric to one another and to the rotatable driving shaft 10 of the driving device. The inside diameter of the collar 14 is substantially larger than the diameter of the driving shaft 8, and the collar projects axially outwardly from the housing 15 a short distance and has its outer end spaced outwardly from the outer end of the driving shaft. A lengthwise slidable detent pin 17 extends radially through the collar 14 and is biased radially inwardly relative to it. Fixed to the outer end of the detent pin 17 is a manual actuator 18, here shown as a T-handle, whereby the detent pin can be drawn outwardly against its bias. As here shown, the stem portion of the T-handle 18 is engageable against a portion of the housing 15 that surrounds the collar 14 to define a normal position of the detent pin 17 toward which it is biased and at which its inner end projects radially inwardly beyond the inner cylindrical surface of the collar, partway to the driving shaft.

To provide for a rotation transmitting connection with the core of the flexible shaft, the driving shaft 8 has a well 19 therein that opens to its outer end and is coaxial with it but is of noncircular cross-section, conventionally being of square cross-section as here shown.

The above described features of the driving device 9 are generally conventional and are in fact standardized on driving devices intended for powering concrete vibrators.

The driven device 11 likewise has conventional and substantially standardized provisions for connection of a flexible shaft to it. Since no adapter device has heretofore been required for connecting a flexible shaft to a driven device, the flexible shaft of the present invention can have a generally conventional rear end portion. Specifically, the core 7 of the flexible shaft has a substantially rigid rear connector means 21 secured to its rear end, and the rear end portion of that connector means has a hollow square cross-section to comprise an axially deep socket or well in which a square cross-section driven shaft 10 of the driven device is axially slidably receivable. To the rear end of the sheath 6 is fixed a rigid tubular rear securement means 22 that has an externally threaded rear end portion which is secureable to an internal thread in the housing of the driven device. The rear connector means 21 on the core projects axially rearwardly a substantial distance beyond the tubular rear securement means 22 on the sheath, to be engaged with the driven shaft 10 before the rear securement means 22 is brought to the point where it can be screwed into the driven device.

At its front end the core 7 of the flexible shaft of this invention has a rigid forwardly projecting connector means 24 that has a substantially tubular rear portion 25 which is clinched to the core, and it has a coaxial front portion 26 of square cross-section that mates with the noncircular well 19 in the driving shaft 8 to be axially receivable therein. Axially intermediate its front and rear portions the front connector means 24 has a coaxial radially outwardly projecting flange 27 that serves to prevent the core from moving endwise out of the sheath, as explained below.

The securement means 30 at the front end of the sheath comprises front and rear tubular members 31 and 32, respectively, that are detachably secured in coaxial telescoped relationship, preferably by means of a threaded connection between them. The rear tubular member 32 has a rear portion which is secured to the front end portion of the sheath and has in its front portion a forwardly opening counterbore 34 which defines in its interior a coaxial annular shoulder 35 that faces forwardly and is of course spaced behind its front end. The front tubular member 31 has in its rear portion a rearwardly opening counterbore 36 which defines in its interior a coaxial annular shoulder 37 that faces rearwardly and is spaced from its rear end. For telescoped connection of the two members 31, 32, one of them is received in the counterbore 36, 34 in the other; and the flange 27 is axially slidably received in the counterbore 34, 36 in said one tubular member, between the shoulders 35, 37, which are axially spaced apart. In this case the front tubular member 31 has an externally threaded reduced diameter rear end portion 38 that is received in the counterbore 34 in the rear tubular member, which has a mating internal thread, and the flange 27 is axially slidable in the counterbore 36 in the front tubular member. The opposing annular shoulders 35, 37 limit axial sliding of the flange 27 and thus prevent the core from sliding out of the sheath, although the core is readily removable endwise forwardly from the sheath when the front tubular member 31 is screwed off of the rear one 32.

The front end portion of the front tubular member 31 has a cylindrical radially outer surface that is of a diameter to be slidably receivable in the fixed collar 14 on the driving device housing. The detent pin 17 is receivable in any one of a plurality of radially outwardly opening holes 40 in the front tubular member, at circumferentially spaced intervals around it, to releasably lock the front sheath securement means 30 to the housing 15 of the driving device.

It will be apparent that for connection of the flexible shaft to the driving device 9 the detent pin 17 is drawn outwardly away from its normal position, the square shaft portion 26 of the front connector means 24 is inserted axially into the mating well in the driving shaft 8, and the front end portion of the front securement means 30 is inserted axially into the fixed collar 14 on the driving device and then rotated until the detent pin 17 drops into one of its detent holes 40.

From the foregoing description taken with the accompanying drawings it will be apparent that this invention provides a flexible shaft which is directly connectable to both a driving device and a driven device without the need for an intermediate coupling adapter, and that the core of the flexible shaft of this invention is normally confined against sliding endwise out of the sheath but is nevertheless readily releaseable so that it can be withdrawn from the sheath. An additional and very important advantage of the flexible sheath of this invention is that it remains cool in operation even when its core has elongated to its acceptable maximum length limit.

What is claimed as the invention is:

1. A flexible shaft for transmitting rotation from a rotatable driving shaft of a relatively stationary driving device to a rotatable driven shaft of a portable driven device, comprising an elongated flexible sheath having rigid tubular securement means at its opposite ends, one for each of said devices whereby the sheath is detachably and nonrotatably connectable with the device, and an elongated flexible core which is rotatable in said sheath and is endwise insertable thereinto and removable therefrom, said flexible shaft being characterized by:

A. said core having rigid axially outwardly projecting connector means fixed to each of its ends, one for each of said rotatable shafts,
  (1) each of said connector means being axially slideable to and from a rotation transmitting connection with its rotatable shaft, and
  (2) said connector means for the rotatable shaft of one of said devices having fixed thereon a coaxial radially outwardly projecting circumferential flange that is spaced axially inwardly from its outer end;
B. the securement means for said one device comprising coaxial front and rear tubular members that are detachably connected in telescoped relationship,
  (1) the rear tubular member having
    (a) a rear portion secured to an end portion of the sheath, and
    (b) a counterbore which opens to its front end and which defines a coaxial annular shoulder that is spaced behind said front end and faces the same;
  (2) the front tubular member having a counterbore which opens to a rear end thereof and which defines a coaxial annular shoulder that is spaced from its rear end and faces the same,
  (3) one of said tubular members having a portion which is coaxially received in the counterbore in the other with said shoulder in that one tubular member opposing and axially spaced from the shoulder in said other tubular member, and
  (4) said flange being axially slidable in the counterbore in said other tubular member between limits defined by said shoulders; and
C. means on a front portion of the front tubular member for detachably securing the same to a fixed part of said one device in concentric surrounding relation to the rotatable shaft thereof and with said connector means for that rotatable shaft connected thereto.

2. A flexible shaft comprising an elongated sheath having front and rear ends and an elongated flexible core having front and rear ends, said core being endwise insertable into said sheath and removable therefrom and being normally rotatable in the sheath with its front and rear ends respectively adjacent to the front and rear ends of the sheath, the rear ends of said sheath and said core being detachably connectable, respectively, with a relatively nonrotatable housing of a driven device and with a rotatable driven shaft of said driven device, the front end of said core being readily detachably connectable with a rotatable driving shaft of a driving device, which shaft has a coaxial non-circular well therein, and the front end of said sheath being detachably connectable with a fixed annular part on a housing of the driving device, said part being coaxial to said driving shaft and spaced radially outwardly therefrom and having a lengthwise slidable detent pin extending radially therethrough that is biased towards the driving shaft, said flexible shaft being characterized by:

A. tubular front securement means for said sheath comprising front and rear tubular members detachably connected in coaxial telescoping relationship,
  (1) said rear tubular member having a rear portion which is secured to the front end portion of the sheath,
  (2) said front tubular member
    (a) having a substantially cylindrical radially outer front surface portion that is axially receivable in said annular part of a driving device and
    (b) having at least one radially opening hole therein wherein said detent pin is receivable to releasably lock the securement, means against movement relative to said annular part,
  (3) each of said tubular members having a counterbore therein
    (a) which opens axially towards the other tubular member and
    (b) which defines an inner coaxial annular shoulder that faces axially towards the other tubular member, and
  (4) one of said tubular members having a portion which is axially adjacent to the other tubular member and which is removably secured in the counterbore in said other tubular member to connect the tubular members with their said shoulders in axially spaced opposing relationship; and
B. rigid front connector means for said core having
  (1) a rear portion secured to the front end portion of the core,
  (2) a coaxial front end portion axially slidably receivable in said noncircular well to provide a readily detachable rotation transmitting connection between the core and said driving shaft, and
  (3) a radially outwardly projecting circumferential flange rearwardly adjacent to its said front end portion that is received in the counterbore in said other of the tubular members to be axially slidable therein between limits defined by said shoulders.

* * * * *